US010969748B1

(12) United States Patent
Goslin

(10) Patent No.: US 10,969,748 B1
(45) Date of Patent: Apr. 6, 2021

(54) SYSTEMS AND METHODS FOR USING A VEHICLE AS A MOTION BASE FOR A SIMULATED EXPERIENCE

(71) Applicant: Disney Enterprises, Inc., Burbank, CA (US)

(72) Inventor: Michael P. Goslin, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 14/981,721

(22) Filed: Dec. 28, 2015

(51) Int. Cl.
G05B 13/02 (2006.01)
G06F 3/01 (2006.01)
G08B 7/06 (2006.01)

(52) U.S. Cl.
CPC .......... *G05B 13/0205* (2013.01); *G06F 3/011* (2013.01); *G08B 7/06* (2013.01)

(58) Field of Classification Search
CPC ....... G05B 13/0205; G06F 3/011; G08B 7/06; A63F 2009/2447; A63F 13/211; A63F 13/21; A63F 13/216; A63F 13/217; A63F 13/50; A63F 13/28; A63F 13/40; G06T 19/006; B60W 60/00136; B60W 60/00133
USPC ......................................................... 701/36
See application file for complete search history.

(56) References Cited

U.S. PATENT DOCUMENTS

| 5,299,291 A | 3/1994 | Ruetz | |
|---|---|---|---|
| 5,766,077 A | 6/1998 | Hongo | |
| 6,007,338 A * | 12/1999 | DiNunzio | G09B 9/02 345/672 |
| 6,053,815 A * | 4/2000 | Hara | A63F 13/08 434/66 |
| 6,200,138 B1 * | 3/2001 | Ando | A63F 13/10 273/148 B |
| 6,691,032 B1 * | 2/2004 | Irish | A63F 13/12 273/461 |

(Continued)

FOREIGN PATENT DOCUMENTS

| IN | 1381KOL2007 | 4/2009 |
|---|---|---|
| JP | 2019065430 | 4/2019 |

(Continued)

OTHER PUBLICATIONS

Adam Hartley, 5 Predictions for the Future of in-Car Entertainment, Apr. 9, 2019 [https://360.here.com/5-predictions-for-the-future-of-in-car-leisure-entertainment], (5 pages).

(Continued)

*Primary Examiner* — Angelina Shudy
(74) *Attorney, Agent, or Firm* — Esplin & Associates, PC

(57) ABSTRACT

This disclosure relates to systems and methods for using a vehicle as a motion base for a simulated experience. To use a vehicle as a motion base for a simulation experience, simulation information for the simulation experience may be obtained. Simulation information may include simulation stimuli that correspond to simulation events. Ride information may be obtained to identify occurrences of simulation events. Simulation stimuli corresponding to the identified simulation events occurrences may be generated. Simulation experience may be provided by operating one or more of a light source inside the vehicle, a speaker, a display, an air conditioner, a heater, a temperature controller of the vehicle, and/or other components.

16 Claims, 11 Drawing Sheets

(56) References Cited

U.S. PATENT DOCUMENTS

| | | | |
|---|---|---|---|
| 7,081,033 B1 | 7/2006 | Mawle | |
| 7,266,847 B2 | 9/2007 | Pauker | |
| 7,739,371 B2 | 6/2010 | Ikegaya | |
| 7,837,544 B2* | 11/2010 | Tipping | A63F 13/10 |
| | | | 463/6 |
| 8,190,295 B1 | 5/2012 | Garretson | |
| 8,758,126 B2* | 6/2014 | Bavitz | A63F 9/24 |
| | | | 463/1 |
| 8,831,228 B1 | 9/2014 | Agrawal | |
| 8,882,595 B2 | 11/2014 | Chowdhary | |
| 8,894,462 B2 | 11/2014 | Leyland | |
| 8,941,690 B2 | 1/2015 | Seder | |
| 8,988,465 B2 | 3/2015 | Baron | |
| 9,007,400 B2 | 4/2015 | Takahashi | |
| 9,008,310 B2 | 4/2015 | Nelson | |
| 9,266,018 B2* | 2/2016 | Story, Jr. | A63F 9/24 |
| 9,293,042 B1* | 3/2016 | Wasserman | G06Q 30/0265 |
| 9,327,189 B2* | 5/2016 | Bavitz | A63F 13/00 |
| 9,361,730 B2 | 6/2016 | Keating | |
| 9,467,515 B1 | 10/2016 | Penilla | |
| 9,610,510 B2* | 4/2017 | Comploi | A63G 25/00 |
| 9,643,086 B2* | 5/2017 | Tipping | A63F 13/10 |
| 9,669,302 B2* | 6/2017 | Park | A63F 13/65 |
| 9,674,361 B2 | 6/2017 | Ristock | |
| 9,715,764 B2 | 7/2017 | Alaniz | |
| 9,744,448 B2 | 8/2017 | Mullen | |
| 9,814,991 B2* | 11/2017 | Van Winkle | A63G 31/16 |
| 9,821,920 B2* | 11/2017 | Cole | B64D 43/00 |
| 9,922,466 B2* | 3/2018 | Donnelly | G06T 19/006 |
| 10,019,070 B2 | 7/2018 | Szczerba | |
| 10,025,431 B2 | 7/2018 | Li | |
| 10,043,316 B2* | 8/2018 | Donnelly | G06T 19/006 |
| 10,046,241 B1* | 8/2018 | Krosky | A63F 13/803 |
| 10,059,347 B2 | 8/2018 | Thieberger-Navon | |
| 10,140,464 B2 | 11/2018 | Lebeck | |
| 10,162,998 B2 | 12/2018 | Park | |
| 10,186,065 B2* | 1/2019 | Anderson | B60K 35/00 |
| 10,310,600 B2 | 6/2019 | Hong | |
| 10,339,711 B2 | 7/2019 | Ng-Thow-Hing | |
| 10,366,290 B2 | 7/2019 | Wang | |
| 10,376,776 B2 | 8/2019 | Lowe | |
| 10,482,669 B2* | 11/2019 | Rober | B60W 10/04 |
| 10,585,471 B2 | 3/2020 | Reichow | |
| 10,589,625 B1 | 3/2020 | Goslin | |
| 10,639,557 B2* | 5/2020 | Hake | A63G 31/02 |
| 2003/0027636 A1 | 2/2003 | Covannon | |
| 2003/0104824 A1* | 6/2003 | Hale | H04M 1/72572 |
| | | | 455/456.1 |
| 2003/0130031 A1* | 7/2003 | Yoshida | A63F 13/10 |
| | | | 463/23 |
| 2004/0059922 A1 | 3/2004 | Harris | |
| 2005/0021192 A1* | 1/2005 | Takafuji | B60R 21/0136 |
| | | | 701/1 |
| 2005/0059483 A1 | 3/2005 | Borge | |
| 2006/0052153 A1 | 3/2006 | Vlazny | |
| 2006/0143270 A1 | 6/2006 | Wodtke | |
| 2006/0224456 A1 | 10/2006 | Walker | |
| 2006/0277100 A1 | 12/2006 | Parham | |
| 2007/0060233 A1 | 3/2007 | Liccardo | |
| 2007/0087834 A1 | 4/2007 | Moser | |
| 2007/0093299 A1 | 4/2007 | Bergeron | |
| 2007/0139671 A1 | 6/2007 | Stevens | |
| 2007/0197275 A1 | 8/2007 | Gagner | |
| 2007/0206023 A1 | 9/2007 | Street | |
| 2008/0091782 A1 | 4/2008 | Jakobson | |
| 2008/0105751 A1 | 5/2008 | Landau | |
| 2008/0148067 A1 | 6/2008 | Sitrick | |
| 2008/0200244 A1 | 8/2008 | Rowe | |
| 2008/0309010 A1 | 12/2008 | Bowling | |
| 2008/0311983 A1* | 12/2008 | Koempel | A63F 13/10 |
| | | | 463/31 |
| 2009/0069084 A1 | 3/2009 | Reece | |
| 2009/0079705 A1* | 3/2009 | Sizelove | B64D 11/0015 |
| | | | 345/173 |
| 2009/0137323 A1 | 5/2009 | Fiegener | |
| 2009/0176566 A1 | 7/2009 | Kelly | |
| 2009/0313358 A1 | 12/2009 | Shepherd | |
| 2010/0033427 A1 | 2/2010 | Marks | |
| 2010/0093421 A1 | 4/2010 | Nyman | |
| 2010/0098092 A1 | 4/2010 | Luo | |
| 2010/0130296 A1* | 5/2010 | Ackley | A63G 7/00 |
| | | | 472/61 |
| 2010/0182340 A1* | 7/2010 | Bachelder | G02B 27/017 |
| | | | 345/633 |
| 2010/0324984 A1 | 12/2010 | Pelto | |
| 2010/0331721 A1* | 12/2010 | Epley | A61B 5/0484 |
| | | | 600/552 |
| 2011/0098092 A1 | 4/2011 | Reiche, III | |
| 2011/0183754 A1 | 7/2011 | Alghamdi | |
| 2012/0089275 A1* | 4/2012 | Yao-Chang | A63H 30/04 |
| | | | 701/2 |
| 2012/0142415 A1* | 6/2012 | Lindsay | G06T 19/006 |
| | | | 463/33 |
| 2012/0256945 A1* | 10/2012 | Kidron | A63G 31/16 |
| | | | 345/619 |
| 2012/0264518 A1* | 10/2012 | Rouille | A63F 13/79 |
| | | | 463/39 |
| 2012/0289122 A1 | 11/2012 | Elliott | |
| 2012/0295703 A1 | 11/2012 | Reiche | |
| 2012/0295704 A1 | 11/2012 | Reiche | |
| 2013/0083003 A1* | 4/2013 | Perez | G06F 3/005 |
| | | | 345/419 |
| 2013/0083061 A1* | 4/2013 | Mishra | H04N 5/265 |
| | | | 345/633 |
| 2013/0157607 A1 | 6/2013 | Paek | |
| 2013/0166147 A1* | 6/2013 | Chudzinski | A63F 13/216 |
| | | | 701/36 |
| 2013/0274024 A1* | 10/2013 | Geylik | A63G 31/16 |
| | | | 472/60 |
| 2013/0296058 A1 | 11/2013 | Leyland | |
| 2014/0067208 A1* | 3/2014 | Klappert | H04N 21/4131 |
| | | | 701/49 |
| 2014/0100020 A1 | 4/2014 | Carroll | |
| 2014/0100029 A1 | 4/2014 | Reiche | |
| 2014/0128144 A1* | 5/2014 | Bavitz | A63F 9/24 |
| | | | 463/23 |
| 2014/0128145 A1* | 5/2014 | Hwang | A63F 9/24 |
| | | | 463/23 |
| 2014/0162785 A1 | 6/2014 | Reiche | |
| 2014/0163771 A1* | 6/2014 | Demeniuk | B60K 37/06 |
| | | | 701/2 |
| 2014/0189017 A1 | 7/2014 | Prakash | |
| 2014/0274313 A1 | 9/2014 | Bala | |
| 2014/0295963 A1* | 10/2014 | Ishikawa | A63F 13/216 |
| | | | 463/31 |
| 2014/0342790 A1* | 11/2014 | Kim | A63F 13/803 |
| | | | 463/6 |
| 2015/0003609 A1 | 1/2015 | Nelson | |
| 2015/0024852 A1 | 1/2015 | Pacey | |
| 2015/0065237 A1* | 3/2015 | Hohn | A63F 13/216 |
| | | | 463/29 |
| 2015/0080125 A1 | 3/2015 | Andre | |
| 2015/0097860 A1* | 4/2015 | Alaniz | G02B 27/017 |
| | | | 345/633 |
| 2015/0097864 A1* | 4/2015 | Alaniz | G06T 19/006 |
| | | | 345/633 |
| 2015/0100179 A1* | 4/2015 | Alaniz | G06F 3/012 |
| | | | 701/1 |
| 2015/0145671 A1 | 5/2015 | Cohen | |
| 2015/0174479 A1 | 6/2015 | Reiche | |
| 2015/0202962 A1* | 7/2015 | Habashima | B60K 35/00 |
| | | | 345/633 |
| 2015/0269780 A1* | 9/2015 | Herman | A63F 13/26 |
| | | | 345/633 |
| 2015/0294505 A1* | 10/2015 | Atsmon | G06T 19/006 |
| | | | 345/633 |
| 2015/0346722 A1* | 12/2015 | Herz | G05D 1/0038 |
| | | | 701/2 |
| 2015/0363092 A1 | 12/2015 | Morton | |
| 2016/0042607 A1 | 2/2016 | McCoy | |
| 2016/0071397 A1 | 3/2016 | Logan | |

(56) References Cited

U.S. PATENT DOCUMENTS

| | | | |
|---|---|---|---|
| 2016/0096114 A1* | 4/2016 | Van Winkle | A63G 31/16 |
| | | | 472/59 |
| 2016/0189444 A1 | 6/2016 | Madhok | |
| 2016/0199730 A1* | 7/2016 | Olson | A63F 13/28 |
| | | | 463/31 |
| 2016/0206955 A1* | 7/2016 | Goslin | A63F 13/215 |
| 2016/0206957 A1* | 7/2016 | Goslin | A63F 13/428 |
| 2016/0216854 A1 | 7/2016 | McClellan | |
| 2016/0224939 A1 | 8/2016 | Chen | |
| 2016/0299567 A1 | 10/2016 | Crisler | |
| 2016/0310839 A1 | 10/2016 | Leyland | |
| 2016/0313792 A1* | 10/2016 | Siegel | B60W 50/08 |
| 2016/0346704 A1* | 12/2016 | Wagner | A63G 7/00 |
| 2017/0021273 A1 | 1/2017 | Rios | |
| 2017/0021282 A1* | 1/2017 | Comploi | A63G 25/00 |
| 2017/0045946 A1* | 2/2017 | Smoot | G06F 3/017 |
| 2017/0050743 A1 | 2/2017 | Cole | |
| 2017/0068311 A1* | 3/2017 | Evans | G06F 3/011 |
| 2017/0072316 A1* | 3/2017 | Finfter | A63F 13/26 |
| 2017/0078621 A1* | 3/2017 | Sahay | H04N 21/854 |
| 2017/0103571 A1* | 4/2017 | Beaurepaire | G01C 21/3667 |
| 2017/0106288 A1 | 4/2017 | Reiche | |
| 2017/0132334 A1* | 5/2017 | Levinson | G06F 17/5009 |
| 2017/0154024 A1 | 6/2017 | Subramanya | |
| 2017/0158023 A1* | 6/2017 | Stevanovic | B60H 1/00771 |
| 2017/0166221 A1* | 6/2017 | Osterman | A63G 25/00 |
| 2017/0236328 A1* | 8/2017 | Eatedali | G01C 21/3688 |
| | | | 345/633 |
| 2017/0253252 A1* | 9/2017 | Donnelly | G06F 3/0338 |
| 2017/0330034 A1 | 11/2017 | Wang | |
| 2017/0344754 A1 | 11/2017 | Kumar | |
| 2017/0352185 A1 | 12/2017 | Bonilla Acevedo | |
| 2018/0008894 A1* | 1/2018 | Sack | G06Q 50/10 |
| 2018/0011988 A1 | 1/2018 | Ziegler | |
| 2018/0040162 A1* | 2/2018 | Donnelly | G05D 1/0246 |
| 2018/0040163 A1* | 2/2018 | Donnelly | G06F 3/017 |
| 2018/0043272 A1* | 2/2018 | Van Winkle | A63G 31/16 |
| 2018/0089900 A1* | 3/2018 | Rober | B60Q 9/00 |
| 2018/0089901 A1* | 3/2018 | Rober | G06K 9/00832 |
| 2018/0096501 A1* | 4/2018 | Anderson | G06T 11/60 |
| 2018/0181412 A1 | 6/2018 | Paratey | |
| 2018/0231973 A1 | 8/2018 | Mattingly | |
| 2018/0247352 A1 | 8/2018 | Rogers | |
| 2018/0369702 A1* | 12/2018 | Hake | A63G 31/02 |
| 2019/0001987 A1* | 1/2019 | Kim | B60W 60/00136 |
| 2019/0014070 A1 | 1/2019 | Mertvetsov | |
| 2019/0047498 A1* | 2/2019 | Alcaidinho | G06F 3/14 |
| 2019/0065970 A1 | 2/2019 | Bonutti | |
| 2019/0075437 A1 | 3/2019 | Shaikh | |
| 2019/0101976 A1 | 4/2019 | Reichow | |
| 2019/0157607 A1 | 5/2019 | Kim | |
| 2019/0220674 A1 | 7/2019 | Khalfan | |
| 2020/0053400 A1 | 2/2020 | Chao | |
| 2020/0074181 A1* | 3/2020 | Chang | G06K 9/00744 |
| 2020/0151768 A1 | 5/2020 | Dekeyser | |
| 2020/0163616 A1 | 5/2020 | Sakaya | |
| 2020/0193163 A1* | 6/2020 | Chang | H04N 13/204 |

FOREIGN PATENT DOCUMENTS

| | | |
|---|---|---|
| WO | 2007101785 A1 | 9/2007 |
| WO | 2018128946 A1 | 7/2018 |

OTHER PUBLICATIONS

Lambros Sarakis, et al., Technological Educational Institute of Sterea Ellada; Hellenic Open University; Synelixis Solutions Ltd., Providing Entertainment Applications in Vanet Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

Kloster, Benjamin, 'Wanted: Encryption Scheme for Copy Protection Purposes', Retrieved from the Internet http://stackoverflow.com/questions/14529732/wanted-encryption-scheme-for-copy-protection-purposes, Jan. 25, 2013, XP055152568, 2 pages.

Dagamant, 'Skylanders Hacking', Retrieved from the Internet http://web.archive.ora/web/20120309212642/http://www.suncries.com/skvlaners-hack ing Feb. 27, 2012, XP055152538, 8 pages.

Extended European Search Report issued in European Patent Application No. 14175300.4, dated Nov. 19, 2014. (6 pgs).

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hac king [retrieved on Nov. 12, 2014] (8 pgs).

"Video Game/ Battle Circuit", TV Tropes, available at «https://web.archive.org/web/20150114005112/http://tvtropes.org/pmwiki/pmwiki .php/VideoGameBattleCircuit» (4 pages).

"Battle Circuit", Capcom, available at «https://web.archive.org/web/20000111073021/http://www.capcom.co.jp/newproducts/ arcade/battle/bs-top. html» (Orig in al Japanese web page followed by English translation), 4 pages.

Apple (Developing Wireless CarPlay System, https://developer.apple.com/videos/play/wwdc2017/717/WWDC 2017, video and slide). (Year: 2017).

Google search "Iphone Figurine" (Year: 2020), 1 page.

NPX "Software-Apple-Carplay: Software Technology for CarPlay", https://www.nxp.com/design/software/embedded-software/software-technology-for-carplay:SOFTWARE-APPLE-CARPLAY (Year: 2020), 3 pages.

* cited by examiner

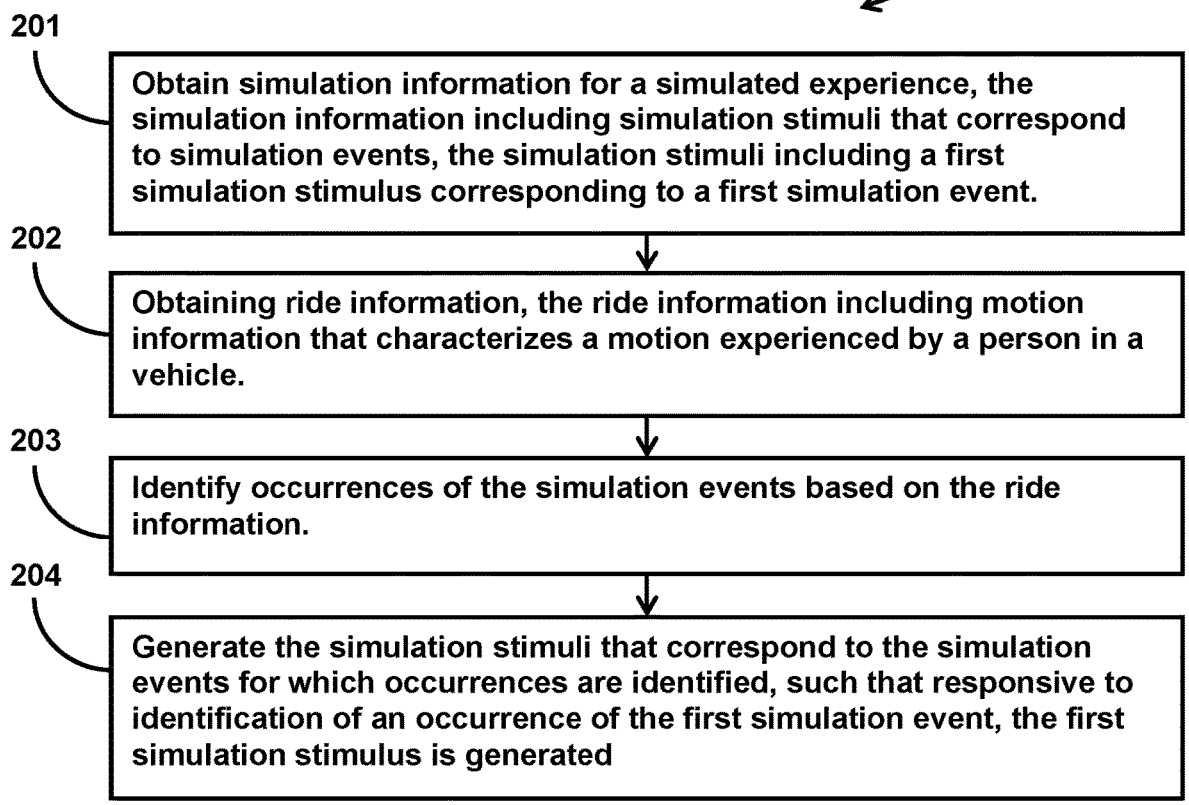

SYSTEMS AND METHODS FOR USING A VEHICLE AS A MOTION BASE FOR A SIMULATED EXPERIENCE

FIELD

This disclosure relates to systems and methods for using a vehicle as a motion base for a simulated experience.

BACKGROUND

Vehicle entertainment systems allow a person to use a display of a vehicle to play movies and/or games. Such vehicle entertainment systems do not allow for movies, games, and/or other entertainment media presented by the vehicle entertainment system to change based on the motion of the vehicle.

SUMMARY

This disclosure relates to using a vehicle as a motion base for a simulated experience. A simulated experience may refer to a recreational presentation conveyed to a person through one or more of visual, audio, haptic and/or other simulation, where the visual, audio, haptic, and/or other simulation changes based on the motion of the vehicle. A recreational presentation may include one or more of a story, an image, a video, a movie, an audio, a song, a game, and/or other recreational presentations. The use of a vehicle as a motion base may allow a motion of the vehicle to form a part of a simulated experience. The use of a vehicle as a motion base may enhance a simulated experience and allow a person to feel more engaged by the simulated experience as the vehicle moves.

A system configured to use a vehicle as a motion base for a simulated experience may include one or more processors and/or other components. The one or more processors may be configured to obtain simulation information for a simulation experience, obtain ride information, identify occurrences of simulation events based on the ride information, and generate simulation stimuli that correspond to simulation events for which occurrences are identified. In some implementations, the one or more processors may be configured to effectuate provision of the simulated experience by operating one or more of a light source inside the vehicle, a speaker, a display, an air conditioner, a heater, a temperature controller of the vehicle, and/or other components.

In some implementations, the one or more processors may be configured to select a simulated experience. A simulation experience may be selected based on one or more of a trip criterion, a user selection, a prior simulated experience, and/or other information. A trip criterion may include one or more information relating to the distance of the trip, the duration of the trip, the locations along the trip, and/or other information relating to the trip. A user selection may include a selection of a simulation experience based on one or more user inputs received through one or more input devices. An input device may include a key entry device, a touch entry device, an imaging device, a sound device, and/or other input devices. A prior simulated experience may include information relating to a simulation experience previously experienced by the user.

The one or more processors may be configured to obtain simulation information for the simulation experience. The simulation information may include simulation stimuli that correspond to simulation events. The simulation stimuli may include a first simulation stimulus that corresponds to a first simulation event. The simulation information may include one or more of a database, a lookup table, and/or other information component.

The one or more processors may be configured to obtain ride information. Ride information may include motion information that characterizes a motion experience by a person in the vehicle. The one or more processor may obtain motion information from one or more of a sensor and/or a wearable sensor that characterizes a motion experienced by a person in the vehicle, and/or other sensors.

In some implementations, ride information may include activity information that characterizes an action performed and/or a sound made by a person in the vehicle. The one or more processors may obtain activity information from one or more of a sensor and/or a wearable sensor that characterizes an action performed by a person in the vehicle and/or a sound made by a person in the vehicle, and/or other sensors.

In some implementations, activity information may include one or more user inputs received through one or more input devices. An input device may include a key entry device, a touch entry device, a sound device, and/or other input devices. The one or more processors may obtain activity information from one or more input devices and/or other devices.

In some implementation, ride information may include trip progress information that characterizes a location of the vehicle along a trip, a distance traveled in a trip, a distance remaining in a trip, a duration traveled in a trip and/or a remaining expected duration of a trip. The one or more processors may obtain trip progress information from one or more sensors that characterizes a location of the vehicle along a trip, a distance traveled and/or remaining in a trip, a duration traveled and/or expected remaining in the trip, and/or other sensors.

In some implementations, ride information may include environment information that characterizes a condition of an environment around the vehicle. The one or more processors may obtain environment information from one or more sensors that characterizes a condition of an environment around the vehicle, and/or other sensors. In some implementations, the one or more processors may obtain environment information by determining a location of the vehicle from one or more sensors that characterize a location of a vehicle and obtaining environment information at the location from a communication device.

In some implementations, ride information may include caravanning information that characterizes a relative position of the vehicle to another vehicle. The one or more processors may obtain caravanning information from one or more sensors that characterizes a relative position of the vehicle to another vehicle, and/or other sensors. In some implementations, the one or more processors may obtain caravanning information from a communication device communicating with another communication device on or in the other vehicle.

The one or more processors may be configured to identify occurrences of simulation events based on the ride information. Occurrences of simulation events may be identified based on one or more of motion information, activity information, trip progress information, environment information, caravanning information, and/or other ride information.

The one or more processors may be configured to generate simulation stimuli that correspond to simulation events for which occurrences are identified. For example, responsive to identification of an occurrence of the first simulation event, the first simulation stimulus may be generated. A simulation stimuli may include one or more of a visual, an audio, a haptic and/or other simulation that may change the simulation experience.

In some implementations, the one or more processors may be configured to effectuate provision of the simulated experience by operating one or more of a light source inside the vehicle, a speaker, a display, and/or other components. In some implementations, the one or more processors may be configured to effectuate provision of the simulated experience by operating one or more of an air conditioner, a heater, a temperature controller of the vehicle, and/or other components.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates a method for using a vehicle as a motion base for a simulated experience in accordance with one or more implementations.

DETAILED DESCRIPTION

Figure 1:
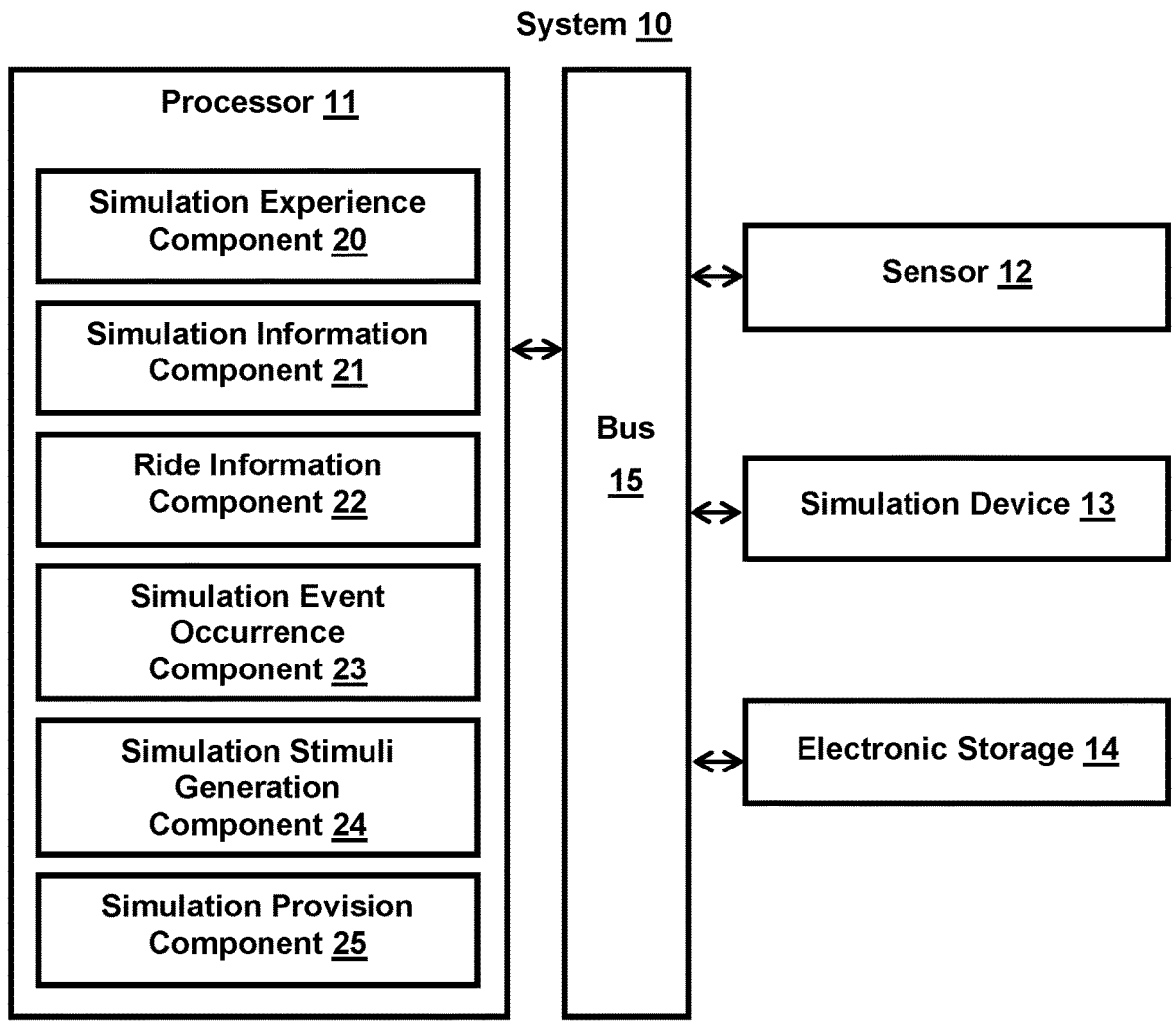
FIG. 1 illustrates a system configured to use a vehicle as a motion base for a simulated experience in accordance with one or more implementations.

FIG. 1 illustrates a system 10 configured to use a vehicle as a motion base for a simulated experience. A simulated experience may refer to a simulated, recreational presentation conveyed to a person through various media. Such media may include one or more of visual, audio, haptic, and/or other media, where the visual, audio, haptic, and/or other media changes based on the motion of the vehicle. A simulated, recreational presentation may include the presentation of simulation content. The simulation content may include one or more of a story, an image, a video, a movie, an audio, a song, a game, and/or other content. For example, a simulated experience may include a story relating to a virtual vehicle in space flight, a movie relating to a battle within a virtual vehicle, a game relating to an exploration of a virtual planet, and/or other simulated experience. The use of a vehicle as a motion base may allow a motion of a vehicle to form a part of a simulated experience. The use of a vehicle as a motion base may enhance the simulated experience and allow a person to feel more engaged by the simulated experience as the vehicle moves.

To use a vehicle as a motion base for a simulation experience, simulation information for the simulation experience may be obtained. Simulation information may include simulation stimuli that correspond to simulation events. Ride information may be obtained to identify occurrences of simulation events. Simulation stimuli corresponding to the identified simulation events occurrences may be generated. Simulation experience may be provided by operating one or more of a light source inside the vehicle, a speaker, a display, an air conditioner, a heater, a temperature controller of the vehicle, and/or other components.

System 10 may include one or more of processor 11, sensor 12, simulation device 13, electronic storage 14, bus 15, and/or other components. Some or all components of system 10 may be installed in a vehicle and/or be otherwise coupled with a vehicle. Some or all components of system 10 may be worn by a person in a vehicle. Some or all of components of system 10 may be installed in a device worn by a person in a vehicle and/or be otherwise coupled with a device worn by a person in a vehicle.

Sensor 12 may be configured to generate output signals conveying ride information. Ride information may characterize one or more aspects of a ride. The aspects of the ride may include a setting of the ride, operation of the vehicle, user interaction or reaction within the vehicle, and/or other aspects. Without limitation, ride information may include motion, action, sound, location, surroundings, and/or other information relating to a vehicle and/or a person in the vehicle. Ride information may include motion information, activity information, trip progress information, environment information, caravanning information, and/or other ride information.

Sensor 12 may include one or more of image sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, and/or other sensors. In some implementations, sensor 12 may be installed in a vehicle and/or be otherwise coupled to a vehicle. In some implementations, sensor 12 may be worn by a person in a vehicle. In some implementations, sensor 12 may be installed in or otherwise coupled to simulation device 13.

Simulation device 13 may be configured to provide a simulation experience. Simulation device 13 may provide a simulation experience visually, audibly, haptically, and/or in other ways. Simulation device 13 may include one or more of a display, a speaker, a light source, an air conditioner, a heater, a temperature controller and/or other simulation devices.

A display may provide a simulation experience through visual information presented on the display. Visual information may include information that may be observed visually. Visual information may include one or more of an image, a video, and/or other visual information. A display may include one or more of a head-mounted display, an optical head-mounted display, a see-through display, an optical see-through display, a video see-through display, a visor, eyeglasses, sunglasses, a computer, a laptop, a smartphone, a tablet, a mobile device, a projector, and/or other displays.

In some implementations, a display may include motion, position, and/or orientation tracking component so that the visual information presented on the display changes as the position and/or orientation of the display changes. In some implementations, a display may be integrated with a vehicle. For example, a display may include one or more of a dashboard display, a global positioning system (GPS) navigation display, a front view camera display, a rear view camera display, a display of a vehicle entertainment system and/or other displays.

A display may be configured to display a simulation experience using augmented reality technology. For example, a display may visually provide the simulation experience by displaying an overlay image over one or more of an image, a video, and/or other visual information so that one or more parts of a real-world objects appears to be augmented by one or more parts of a virtual-world objects. In some implementations, a display may use augmented reality technology to display a simulation experience by using systems and methods described in U.S. patent application Ser. No. 14/966,754, entitled "SYSTEMS AND METHODS FOR AUGMENTING AN APPEARANCE OF AN ACTUAL VEHICLE COMPONENT WITH A VIRTUAL VEHICLE COMPONENT," filed Dec. 11, 2015, the foregoing being incorporated herein by reference in its entirety. Other systems and methods of providing a simulation experience are contemplated.

A speaker may provide a simulation experience through audio information generated by the speaker. Audio information may include information that may be observed audibly. Audio information may include one or more of sound, vibration and/or other audio information. A speaker may include one or more of a headphone, an earphone, a headset, an earset, and/or other speakers. In some implementations, a speaker may include a speaker associated with a display. For example, a speaker may include a speaker of a mobile device. In some implementations, a speaker may be integrated with a vehicle. For example, a speaker may include a sound system of a vehicle.

A light source may provide a simulation experience through one or more wavelengths and/or intensities of light. A light source may include an electric lighting, a fluorescent lighting, an incandescent lighting, an infrared lighting, a light-emitting diode, and/or other light sources. In some implementations, a light source may include a light source of a mobile device. In some implementations, a light source may be integrated with a vehicle. For example, a light source may include one or more interior light sources of a vehicle.

An air conditioner, a heater and temperature controller may provide a simulation experience through one or more of air flow and/or change in temperature. An air conditioner may include an air conditioner of a vehicle, an air conditioner inside a vehicle and/or other air conditioners. A heater may include a heater of a vehicle, a heater inside a vehicle, and/or other heaters. A temperature controller may include a temperature controller of a vehicle, a temperature controller inside a vehicle, and/or other temperature controllers.

Electronic storage 14 may include electronic storage media that electronically stores information. Electronic storage 14 may store software algorithms, information determined by processor 11, information received remotely, and/or other information that enables system 10 to function properly. For example, electronic storage 14 may store simulation information (as discussed elsewhere herein), ride information (as discussed elsewhere herein), information relating to a vehicle, information relating to a person in a vehicle, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more computer program components. The computer program components may include one or more of simulation experience component 20, simulation information component 21, ride information component 22, simulation event occurrence component 23, simulation stimuli generation component 24, simulation provision component 25, and/or other components.

Simulation experience component 20 may be configured to select a simulated experience. A simulation experience may be selected based on one or more of a trip criterion, a user selection, a prior simulated experience, and/or other information. Simulation experience component 22 may include or retrieve information (for example, a database, etc.) that matches one or more of a trip criterion, a user selection, a prior simulated experience, and/or other information relating to a particular simulation experience.

A simulation experience may be selected based on a trip criterion. A trip criterion may refer to one or more physical and/or temporal characteristics of a trip. By way of non-limiting example, a trip criterion may include one or more information relating to the trip destination, the distance of the trip, the duration of the trip, the locations along the trip and/or other information relating to the trip. A trip criterion may be obtained based on one or more user inputs received through one or more input devices, and/or from one or more navigation devices.

In some implementations, simulation experience component 22 may select a simulated experience based on a trip destination. A trip destination may refer to a destination on one or more parts of a trip. For example, simulation experience component 22 may match a trip destination of a home to a simulation experience relating to a space travel to a home base, a home planet, or a home ship. As another example, simulation experience component 22 may match a trip destination of a school to a simulation experience relating to a space travel to a training ground.

In some implementations, simulation experience component 22 may select a simulated experience based on a distance of a trip. A distance of a trip may refer to a distance of one or more parts of a trip. For example, simulation experience component 22 may match a short distance of a trip to a simulation experience relating to a space race to a nearby object/location. As another example, simulation experience component 22 may match a long distance of a trip to a simulation experience relating to a space race to a distant object/location. In some implementations, simulation component 22 may select a simulation experience so that a story of the simulation experience reaches its peak when the vehicle is estimated to be at a certain location in the trip. For example, simulation experience component 22 may select a simulation experience so that a story of the simulation experience will reach its peak when the vehicle is expected to have traveled a certain percentage (e.g., 70%) of the distance of the trip.

In some implementations, simulation experience component 22 may select a simulated experience based on a duration of a trip. A duration of a trip may refer to a duration of one or more parts of a trip. For example, simulation experience component 22 may match a short duration of a trip to a simulation experience relating to a short space battle. As another example, simulation experience component 22 may match a long duration of a trip to a simulation experience relating to a long space battle. In some implementations, simulation component 22 may select a simulation experience so that a story of the simulation experience reaches its peak when the vehicle is estimated to have a certain duration remaining in the trip. For example, simulation experience component 22 may select a simulation experience so that a story of the simulation experience will reach its peak when the vehicle is expected to have a certain percentage (e.g., 30%) of the duration remaining in the trip.

Figure 8:
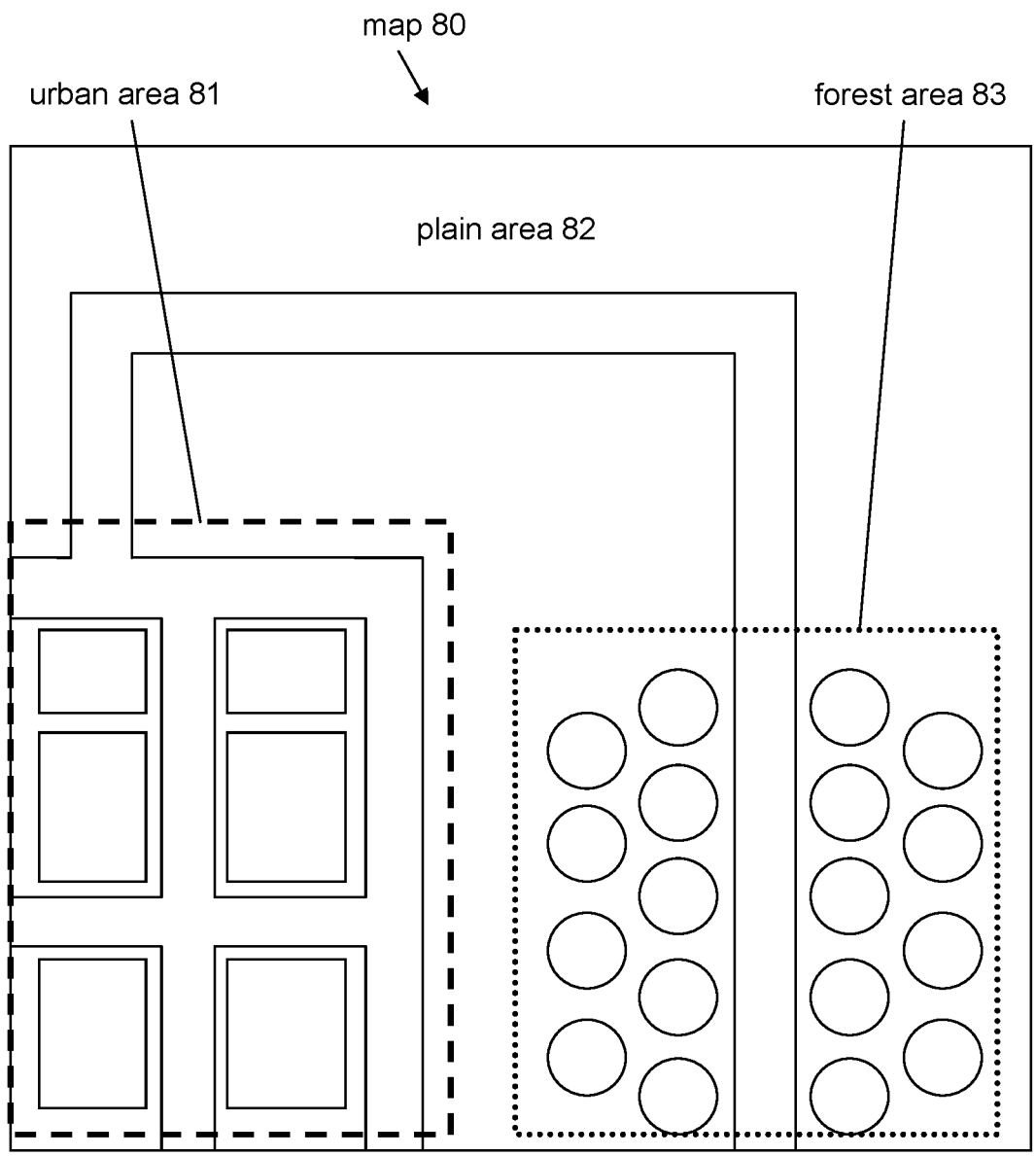
FIG. 8 illustrates a map showing an urban area, a plain area, and a forest area.

In some implementations, simulation experience component 22 may select a simulated experience based on a location along a trip. A location along a trip may refer to a location along one or more parts of a trip. As non-limiting examples, simulation experience component 22 may match an urban area along a trip to a simulation experience in a virtual city, a plain area along a trip to a simulation experience in a virtual field. and a forest area along a trip to a simulation experience in a virtual forest. For example, FIG. 8 illustrates a map 80 showing urban area 81, plain area 82, and forest area 83. Simulation experience component 22 may determine, from a navigation system of a vehicle, that the vehicle is planning on taking a trip starting in urban area 81, moving through plain area 82, and entering forest area 83. Simulation experience may select a simulation experience so that when the vehicle is in urban area 81, the simulation experience occurs in a virtual city under the Empire's control, when the vehicle is in plain area 82, the simulation experience occurs in a virtual plain outside the virtual city, and when the vehicle is in forest area 82, the simulation experience occurs in a virtual forest filled with Ewoks.

A trip criterion may be obtained based on one or more user inputs received through one or more input devices. A user input may refer to one or more information provided by a user through an input device. By way of non-limiting example, a user input may include one or more information relating to a simulation, a trip criterion, a user selection, a prior simulated experience, and/or other information. One or more user inputs may be received through one or more input devices. By way of non-limiting example, an input device may include a key entry device, a touch entry device, an imaging device, a sound device, and/or other input devices.

A key entry device may include a device that allows a user to provide one or more user inputs by typing one or more of characters, numbers, and/or other symbols. A key entry device may include a separate device or a part of another device. For example, a key entry device may include a keyboard coupled to processor 11. As another example, a key entry device may include a mobile device coupled to processor 11. A user may provide one or more user inputs by typing one or more information. For example, a user may provide one or more user inputs by typing one or more of a trip destination, a distance of a trip, a duration of a trip, a location along a trip, and/or other information relating to a trip.

A touch entry device may include a device that allows a user to provide user inputs by touching a user interface of the touch entry device. A touch entry device may include a separate device or a part of another device. For example, a touch entry device may include a touch screen coupled to processor 11. As another example, a touch entry device may include a mobile device coupled to processor 11. A user may provide one or more user inputs by touching one or more portions of the touch entry device corresponding to one or more information. For example, a user may provide one or more user inputs by touching one or more portions of the touch entry device corresponding to one or more of a trip destination, a distance of a trip, a duration of a trip, a location along a trip, and/or other information relating to a trip.

An imaging device may include a device that allows a user to provide user inputs by using an image sensor of the imaging device. An imaging device may include a separate device or a part of another device. For example, an imaging device may include an image sensor coupled to processor 11. As a non-limiting example, an imaging device may include sensor 12. As another example, an imaging device may include a mobile device coupled to processor 11. A user may provide one or more user inputs by directing the field of view of the imaging device to objects that include information. For example, a user may provide one or more user inputs by directing the field of view of the imaging device to objects that include information about one or more of a trip destination, a distance of a trip, a duration of a trip, a location along a trip, and/or other information relating to a trip.

A sound device may include a device that allows a user to provide user inputs through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user inputs by speaking one or more of a trip destination, a distance of a trip, a duration of a trip, a location along a trip, and/or other information relating to a trip.

In some implementations, a trip criterion may be obtained from one or more navigation devices. A navigation device may refer to a device that keeps track of a location of a vehicle on a trip. For example, a navigation device may include a navigation/GPS system of a vehicle and/or a navigation/GPS system coupled to processor 11. As another example, a navigation device may include a mobile device coupled to processor 11. Simulation experience component 20 may obtain from one or more navigation devices one or more of a trip destination, a distance of a trip, a duration of a trip, a location along a trip, and/or other information relating to a trip.

A simulation experience may be selected based on a user selection. A user selection may include a selection of a simulation experience based on one or more user inputs received through one or more input devices. By way of non-limiting example, an input device may include a key entry device, a touch entry device, an imaging device, a sound device, and/or other input devices, as described above. In some implementations, a user may select a simulation experience by using a key entry device to type one or more of characters, numbers, and/or other symbols corresponding to the simulation experience. In some implementations, a user may select a simulation experience by using a touch entry device to touch one or more portions of the touch entry device corresponding to the simulation experience.

In some implementations, a user may select a simulation experience by using an imaging device by directing the field of view of the imaging device to objects that include information relating to the simulation experience. For example, a user may direct the field of view of the imaging device to an augmented reality marker containing information relating to the simulated experience. An augmented reality marker may be two-dimensional or three-dimensional. As a non-limiting example, an augmented reality marker may include one or more of a sticker, a label, a barcode, a quick response (QR) code, and/or other augmented reality marker. In some implementations, a user may select a simulation experience by using a sound device by speaking one or more information relating to the simulated experience.

A simulation experience may be selected based on a prior simulated experience. A prior simulated experience may refer to one or more simulated experience previously presented to a user. Information regarding a prior simulation experience may be obtained from a memory of system 10 (e.g., memory of processor 11, memory of electronic storage 14, and/or memory of another component of system 10) and/or a memory otherwise coupled to system 10 (e.g., memory of a mobile device). For example, information regarding a prior simulation experience may indicate that the prior simulation experience was not concluded. In some implementations, simulation component 22 may select the prior simulated experience and continue the presentation of the prior simulation experience.

Simulation Information component 21 may be configured to obtain simulation information for the simulation experience. The simulation information may include one or more of a database, a lookup table, and/or other information component that allows simulation information component 21 to match a simulation event to a simulation stimulus. A simulation event may refer to one or more of specific motions, specific actions, specific sounds, specific locations, specific surroundings, and/or other specific conditions relating to a vehicle and/or a person in the vehicle. A simulation stimulus may refer to one or more of a visual, an audio, a haptic and/or other simulation that may change a simulation experience. The simulation information may be programmed into simulation information component 21, updated by simulation information component 21, obtained by simulation information component 21 from electronic storage 14, obtained by simulation information component 21 from a remote location, and/or obtained by simulation information component 21 in other ways.

The simulation information may include simulation stimuli that correspond to simulation events. The simulation stimuli may include a first simulation stimulus that corresponds to a first simulation event. For example, a particular simulation stimulus (e.g., a virtual vehicle jumping into light speed/a virtual vehicle being hit by a weapon fire) may correspond to a particular motion of a vehicle (e.g., accelerating/breaking). As another example, a particular simulation stimulus (e.g., a virtual location shaking and/or virtual objects falling/moving) may correspond to a particular activity inside a vehicle (e.g., high volume and/or intensity of physical activity inside a vehicle). As another example, a particular simulation stimulus (e.g., the size, shape, and/or angle of a virtual object changing and/or specific actions taken by a virtual object, such as communicating or firing a weapon) may correspond to a particular location of a vehicle (e.g., distance from a destination or duration to a destination). As another example, a particular simulation stimulus (e.g., virtual rain in a virtual location) may correspond to a particular environment around a vehicle (e.g., rain). Other simulation stimulus and simulation events are contemplated.

Ride information component 22 may be configured to obtain ride information. Ride information may characterize one or more aspects of a ride. The aspects of the ride may include a setting of the ride, operation of the vehicle, user interaction or reaction within the vehicle, and/or other aspects. Without limitation, ride information may include motion, action, sound, location, surroundings, and/or other information relating to a vehicle and/or a person in the vehicle. Ride information may be obtained from output signals generated by sensor 12.

Ride information may include motion information. Motion information may characterize a motion experience by a person in a vehicle at a time, over a duration of time, at a location, or over a distance. Motion information may include one or more information regarding motion experienced by a person in a vehicle, including one or more of moving forward, moving backwards, moving right, moving left, moving up, moving down, turning left, turning right, sloping up, sloping down, acceleration in any direction and/or angle, deceleration in any direction and/or angle, jostling, hitting a speedbump, hitting a pothole, and/or other motion information. Processor 11 may obtain motion information from output signals generated by sensor 12. In some implementations, sensor 12 may include one or more of a vehicle speed sensor, a wheel speed sensor, a motion sensor, an accelerometer, a tilt sensor, an inclination sensor, an angular rate sensor, a gyroscope, a magnetometer, a vibration sensor, a vehicle sensor, an engine control module sensor, and/or other sensors.

In some implementations, ride information may include activity information. Activity information may characterize an action performed and/or a sound made by a person in a vehicle at a time, over a duration of time, at a location, or over a distance. Activity information may include one or more information regarding activity of a person in a vehicle, including one or more of quantity and/or quality of action and/or sound made by the person, and/or other activity information. Processor 11 may obtain activity information from output signals generated by sensor 12. In some implementations, sensor 12 may include one or more of an image sensor that characterizes an action performed by a person in the vehicle, a sound sensor that characterizes a sound made by a person in the vehicle, a wearable sensor that characterizes an action performed and/or a sound made by a person in the vehicle, and/or other sensors.

In some implementations, activity information may include one or more user inputs received through one or more input devices. An input device may include a key entry device, a touch entry device, a sound device, and/or other input devices. For example, one or more persons in the vehicle may change a simulated experience by providing activity information through the use of one or more user input devices. One or more persons in the vehicle may be able to provide the same or different types of activity information. For example, one person may be able to provide activity information corresponding to a virtual weapons control of a virtual spaceship while another person may be able to provide activity information corresponding to a virtual navigation control of the virtual spaceship. Processor 11 may obtain activity information from output signals generated by one or more user input devices.

In some implementation, ride information may include trip progress information. Trip progress information may characterize a location of a vehicle along a trip, a distance traveled in a trip, a distance remaining in a trip, a duration traveled in a trip and/or a remaining expected duration of a trip. Trip progress information may include one or more information regarding a status of a trip, including one or more of location of a vehicle, a traveled distance, a remaining distance, a traveled duration, an expected remaining duration, and/or other trip progress information. Processor 11 may obtain trip progress information from output signals generated by sensor 12. In some implementations, sensor 12 may include one or more of a navigation sensor, a geolocation sensor, a magnetometer, a vehicle sensor, an engine control module sensor, and/or other sensors.

In some implementations, ride information may include environment information. Environment information may characterize a condition of an environment around a vehicle at a time, over a duration of time, at a location, or over a distance. Environment information may include one or more of information regarding a condition of an environment around a vehicle, including one or more of time, weather, temperature, humidity, lighting, terrain, nearby objects, nearby buildings, and/or other environment information. Processor 11 may obtain environment information from output signals generated by sensor 12. In some implementations, sensor 12 may include one or more of a clock, an image sensor, a temperature sensor, a vibration sensor, a light detection sensor, a vehicle sensor, an engine control module sensor, and/or other sensors. In some implementations, processor 11 may obtain environment information by determining a location of a vehicle from output signals generated by sensor 12 and obtaining environment information at the location from a communication device.

In some implementations, ride information may include caravanning information. Caravanning information may characterize a relative position of the vehicle to another vehicle at a time, over a duration of time, at a location, or over a distance. Caravanning information may include one or more information regarding a position, an orientation, and/or speed of the vehicle and/or another vehicle. Processor 11 may obtain caravanning information from output signals generated by sensor 12. In some implementations, sensor 12 may include one or more of an image sensor, a vehicle speed sensor, a wheel speed sensor, a motion sensor, an accelerometer, a tilt sensor, an inclination sensor, an angular rate sensor, a gyroscope, a navigation sensor, a geolocation sensor, a magnetometer, a radar detector, a radar sensor, a proximity sensor, a distance sensor, a vehicle sensor, an engine control module sensor, and/or other sensors. In some implementations, processor 11 may obtain caravanning information from a communication device communicating with another communication device on or in another vehicle. For example, the other communication device on the other vehicle may provide one or more caravanning information regarding the other vehicle.

Simulation event occurrence component 23 may be configured to identify occurrences of simulation events based on ride information. A simulation event may refer to one or more of specific motions, specific actions, specific sounds, specific locations, specific surroundings, and/or other specific conditions relating to a vehicle and/or a person in the vehicle. Occurrences of simulation events may be identified based on one or more of motion information, activity information, trip progress information, environment information, caravanning information, and/or other ride information. Simulation event occurrence component 23 may be configured to identify an occurrence of a simulation event when one or more of motion information, activity information, trip progress information, environment information, caravanning information, and/or other ride information indicates occurrence of one or more of specific motions, specific actions, specific sounds, specific locations, specific surroundings, and/or other specific conditions relating to a vehicle and/or a person in the vehicle that correspond to a specific simulation event.

Criteria for an occurrence of one or more simulation events may be referred to as a simulation event logic. The simulation event logic may be programmed into simulation event occurrence component 23, updated by simulation event occurrence component 23, obtained by simulation event occurrence component 23 from the simulation information, obtained by simulation event occurrence component 23 from electronic storage 14, obtained by simulation event occurrence component 23 from a remote location, and/or obtained by simulation event occurrence component 23 in other ways.

Simulation stimulation generation component 24 may be configured to generate simulation stimuli that correspond to simulation events for which occurrences are identified. A simulation stimulus may refer to one or more of a visual, an audio, a haptic and/or other simulation that may change a simulation experience. Simulation stimulation generation component 24 may be configured to generate a simulation stimulus for a simulation event when the simulation stimulus corresponding to the simulation event is found in the simulation information.

Simulation provision component 25 may be configured to effectuate provision of a simulated experience by operating simulation device 13. Simulation device 13 may include one or more of a display, a speaker, a light source, an air conditioner, a heater, a temperature controller and/or other simulation devices. Simulation provision component 25 may be configured to effectuate provision of a simulated experience through one or more of visual, audio, haptic and/or other simulation, where the visual, audio, haptic, and/or other simulation changes based on simulation stimuli.

Figure 3A:
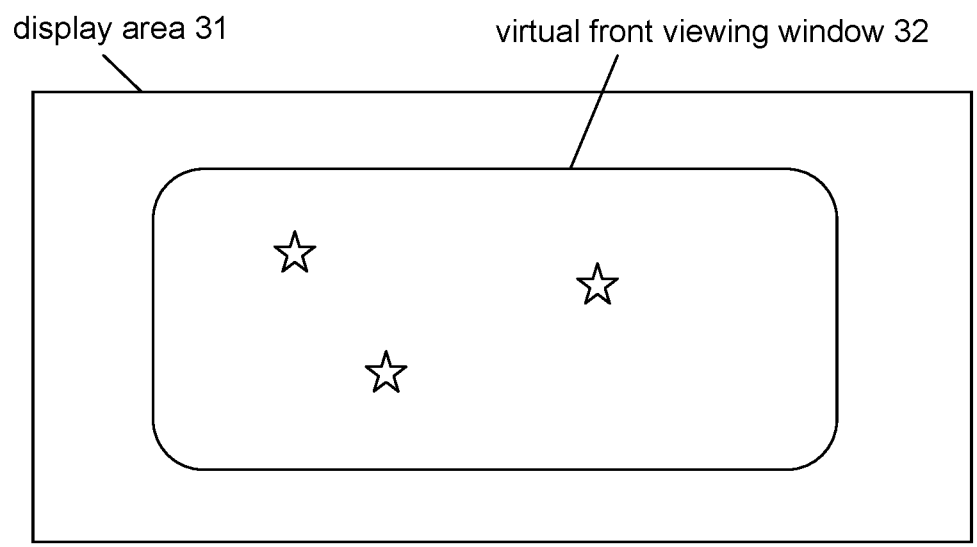
FIG. 3A illustrates a virtual front viewing window shown in a display area of a display in accordance with one or more implementations.
Figure 3B:
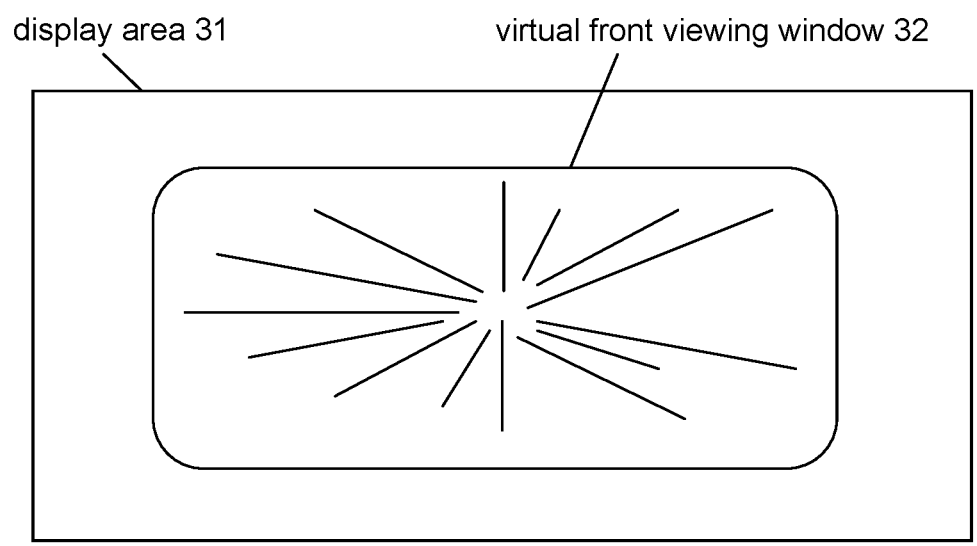
FIG. 3B illustrates a virtual front viewing window shown in a display area of a display in accordance with one or more implementations.

For example, FIGS. 3A-7B illustrate a simulation experience provided through a display of simulation device 13. In FIGS. 3A-3B, the simulation experience relates to a flight of a virtual spaceship through space. Visual simulation showing the virtual vehicle jumping into light speed (simulation stimulus) is generated when an acceleration of a vehicle (simulation event) is identified. FIGS. 3A-3B illustrate virtual front viewing window 32 of the virtual spaceship shown in display area 31 of the display. In FIG. 3A, the acceleration of the vehicle has not been identified and stars are shown within virtual front viewing window 32. In FIG. 3B, the acceleration of the vehicle has been identified and light speed simulation is shown within virtual front viewing window 32. As another example, provision of the simulation experience may include operating a speaker of simulation device 13 to provide sound simulation relating to light speed travel.

As another example, visual simulation showing the change in relative position of a virtual vehicle to other virtual vehicles (simulation stimulus) may be generated when change in speed of a vehicle (simulation event) is identified. For example, a simulation experience may relate to a virtual spaceship being followed by virtual enemy spaceships. When acceleration of the vehicle is identified, visual simulation may display the virtual enemy spaceships falling behind the virtual spaceship. When deceleration of the vehicle is identified, visual simulation may display virtual enemy spaceships catching up to or overtaking the virtual spaceship.

As another example, visual simulation showing the beginning/ending of a simulation experience/segment of a simulation experience (simulation stimulus) may be generated when acceleration from a stop/deceleration to a stop of a vehicle (simulation event) is identified. For example, a simulation experience may relate to a race/competition between virtual vehicles. When acceleration from a stop of the vehicle is identified, visual simulation may display the beginning of the race/competition. When deceleration to a stop of the vehicle is identified, visual simulation may display the ending of the race/competition.

Figure 4A:
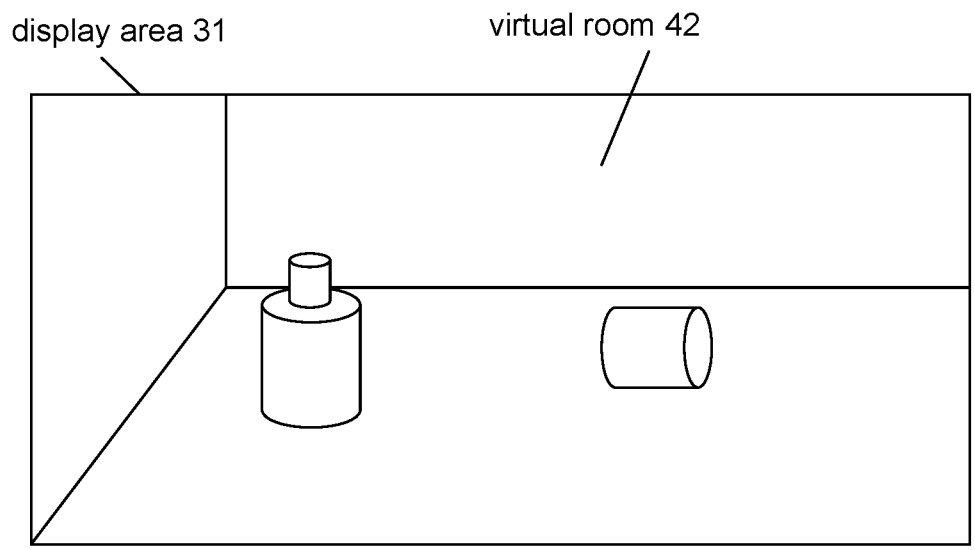
FIG. 4A illustrates a virtual room shown in a display area of a display in accordance with one or more implementations.
Figure 4B:
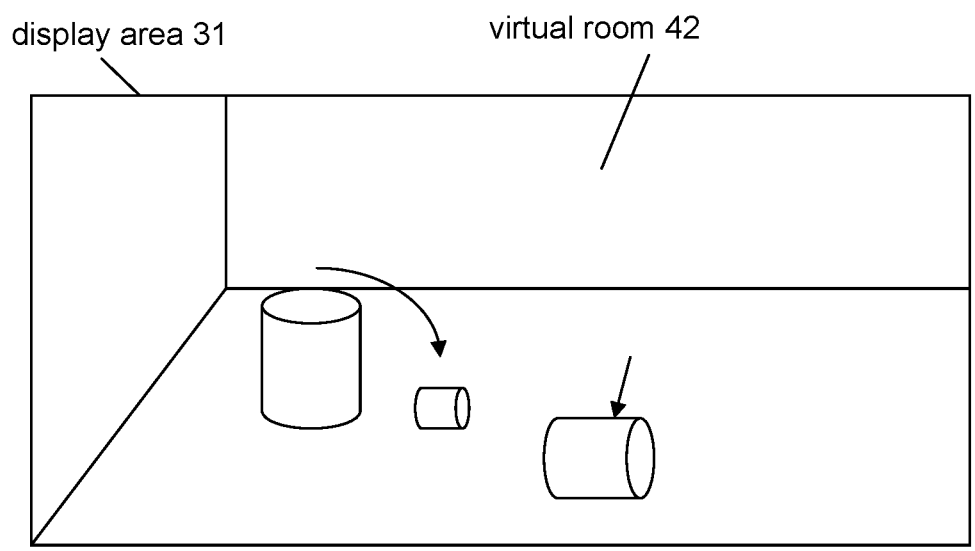
FIG. 4B illustrates a virtual room shown in a display area of a display in accordance with one or more implementations.

In FIGS. 4A-4B, the simulation experience relates to a battle within a virtual spaceship. Visual simulation showing virtual objects being thrown around (simulation stimulus) is generated when high activity within a vehicle (simulation event) is identified. FIGS. 4A-4B illustrate virtual room 42 shown in display area 31 of the display. In FIG. 4A, the high activity within the vehicle has not been identified and the virtual objects are shown to be stationary within virtual room 42. In FIG. 4B, the high activity within the virtual vehicle has been identified and the virtual objects are thrown around within virtual room 42. As another example, provision of the simulation experience may include operating a speaker of simulation device 13 to provide sound simulation relating to virtual objects being thrown around.

Figure 5A:
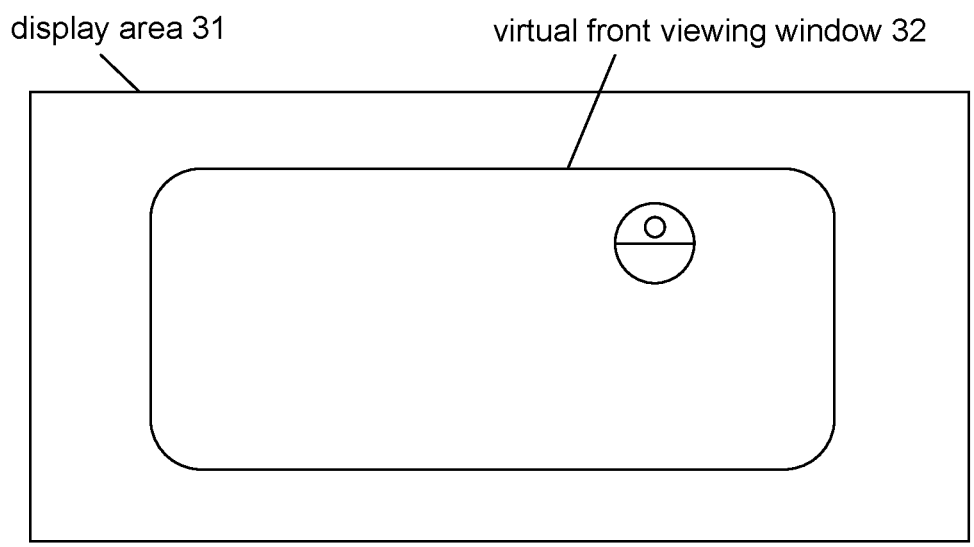
FIG. 5A illustrates a virtual front viewing window shown in a display area of a display in accordance with one or more implementations.
Figure 5B:
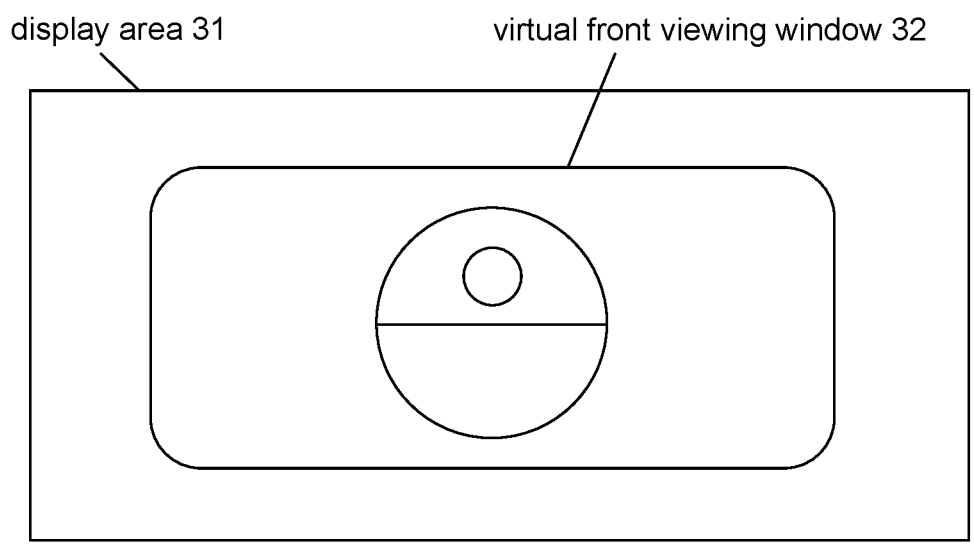
FIG. 5B illustrates a virtual front viewing window shown in a display area of a display in accordance with one or more implementations.

In FIGS. 5A-5B, the simulation experience relates to a virtual spaceship approaching a virtual Death Star from space. Visual simulation showing the virtual Death Star becoming larger (simulation stimulus) and changing position is generated when the location of the vehicle approaches the destination (simulation event). FIGS. 5A-5B illustrate virtual front viewing window 32 of the virtual spaceship shown in display area 31 of the display. In FIG. 5A, the location of the vehicle is determined to be a set distance from the destination, with the destination being to the right of the vehicle. In response, the virtual Death Star is shown to be far and to the right. In FIG. 5B, the location of the vehicle is determined to be closer, with the destination being directly in front of the vehicle. In response, the virtual Death Star is shown to be close and in front.

Figure 6A:
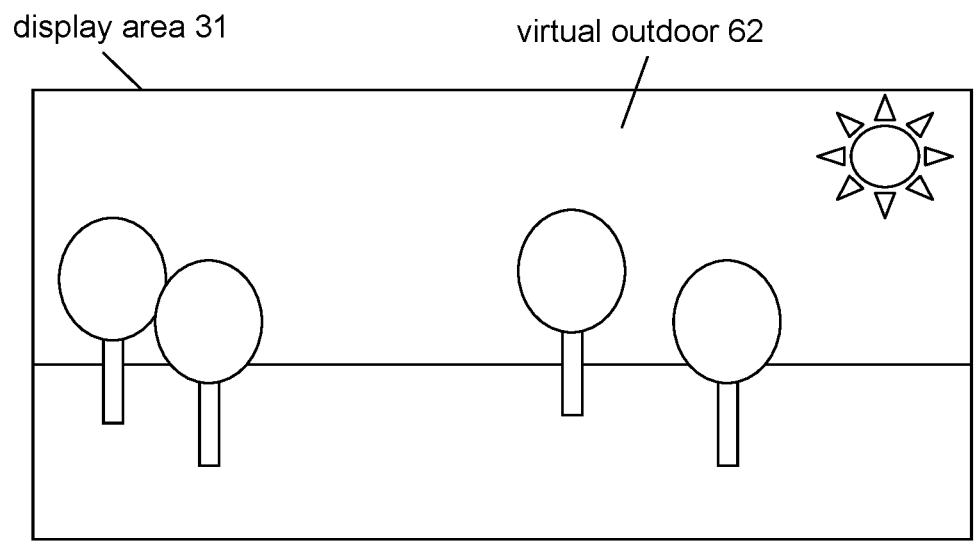
FIG. 6A illustrates a virtual outdoor shown in a display area of a display in accordance with one or more implementations.
Figure 6B:
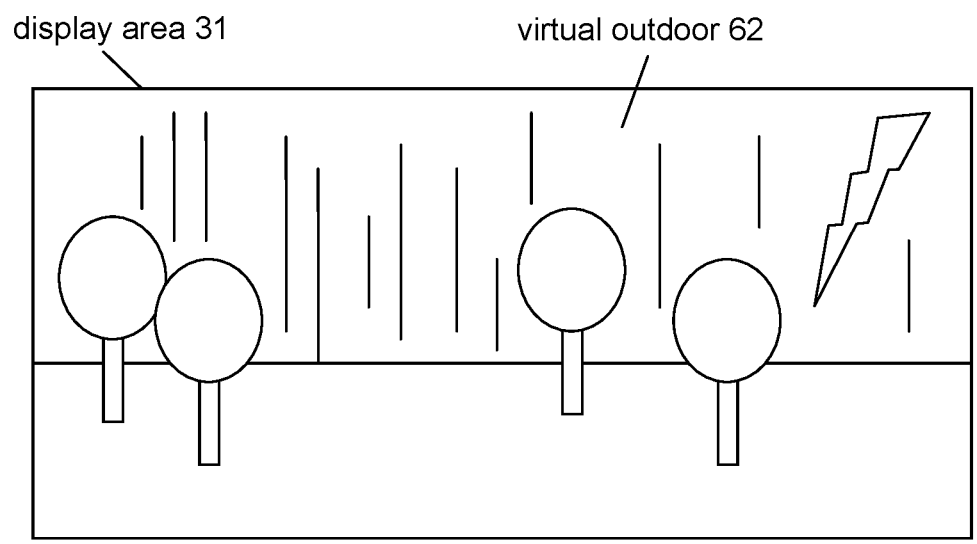
FIG. 6B illustrates a virtual outdoor shown in a display area of a display in accordance with one or more implementations.

In FIGS. 6A-6B, the simulation experience relates to exploring a virtual planet. Visual simulation showing a virtual rainstorm (simulation stimulus) is generated when the vehicle is in a rainstorm (simulation event). FIGS. 6A-6B illustrate virtual outdoor 62 shown in display area 31 of the display. In FIG. 6A, the vehicle is not in a rainstorm and a sunny weather is shown for virtual outdoor 62. In FIG. 6B, the vehicle is in a rainstorm and a virtual rainstorm is shown in virtual outdoor 62. As another example, provision of the simulation experience may include operating a light source of simulation device 13 to provide visual simulation relating to a virtual lightning. As another example, provision of the simulation experience may include operating one or more of an air conditioner, a heater, and/or a temperature controller of simulation device 13 to provide air flow and/or temperature changes relating to the virtual rainstorm.

Figure 7A:
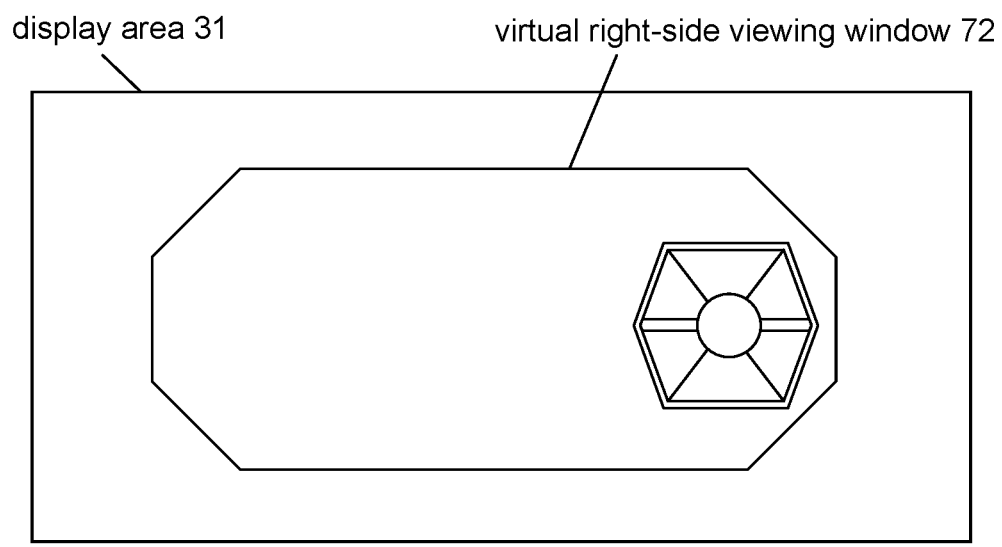
FIG. 7A illustrates a virtual side viewing window shown in a display area of a display in accordance with one or more implementations.
Figure 7B:
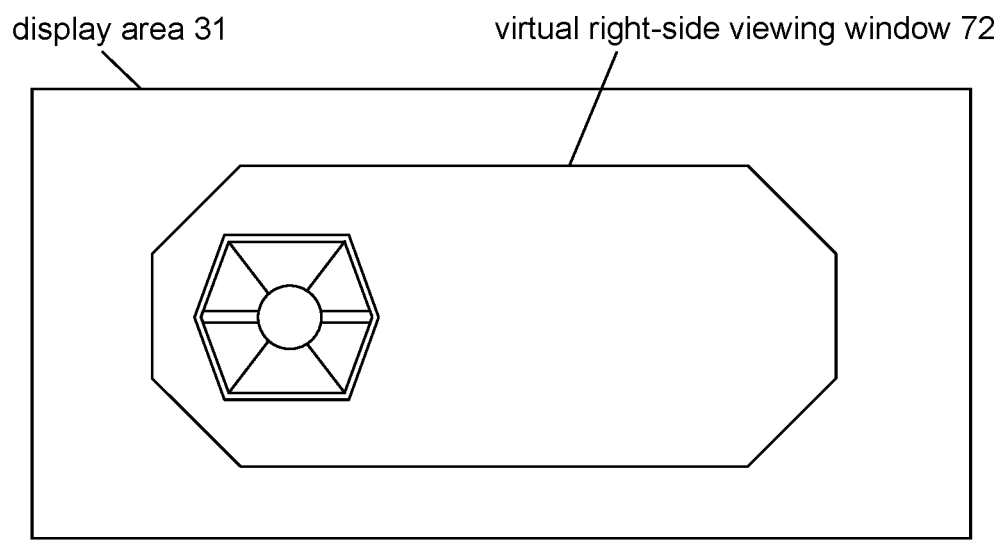
FIG. 7B illustrates a virtual side viewing window shown in a display area of a display in accordance with one or more implementations.

In FIGS. 7A-7B, the simulation experience relates to a race between virtual spaceships. Visual simulation showing a relative position of another virtual vehicle (simulation stimulus) is generated when another vehicle comes near the vehicle (simulation event). FIGS. 7A-7B illustrate virtual right-side viewing window 72 of the virtual spaceship shown in display area 31 of the display. In FIG. 7A, the location of the other vehicle is determined to be to the right and behind the vehicle. In response, the other virtual spaceship is shown to be to the right and behind the virtual spaceship. In FIG. 7B, the location of the other vehicle is determined to be the right and in front of the vehicle. In response, the other virtual spaceship is shown to be to the right and ahead of the virtual spaceship.

Figure 9:
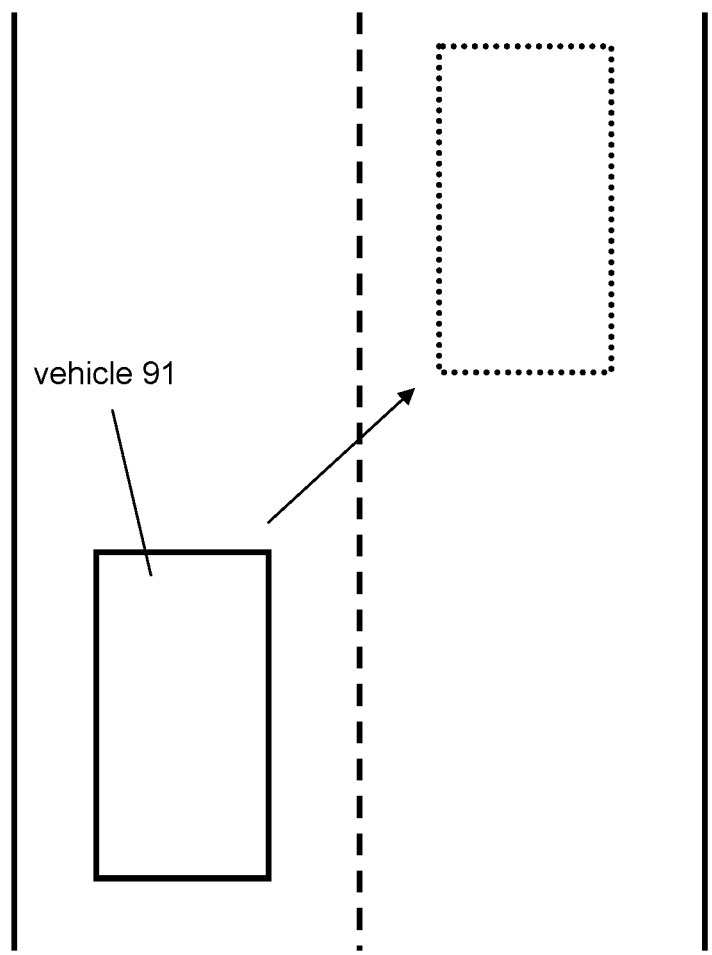
FIG. 9 illustrates a bird's eye view of a vehicle moving to a lane to its right.
Figure 10:
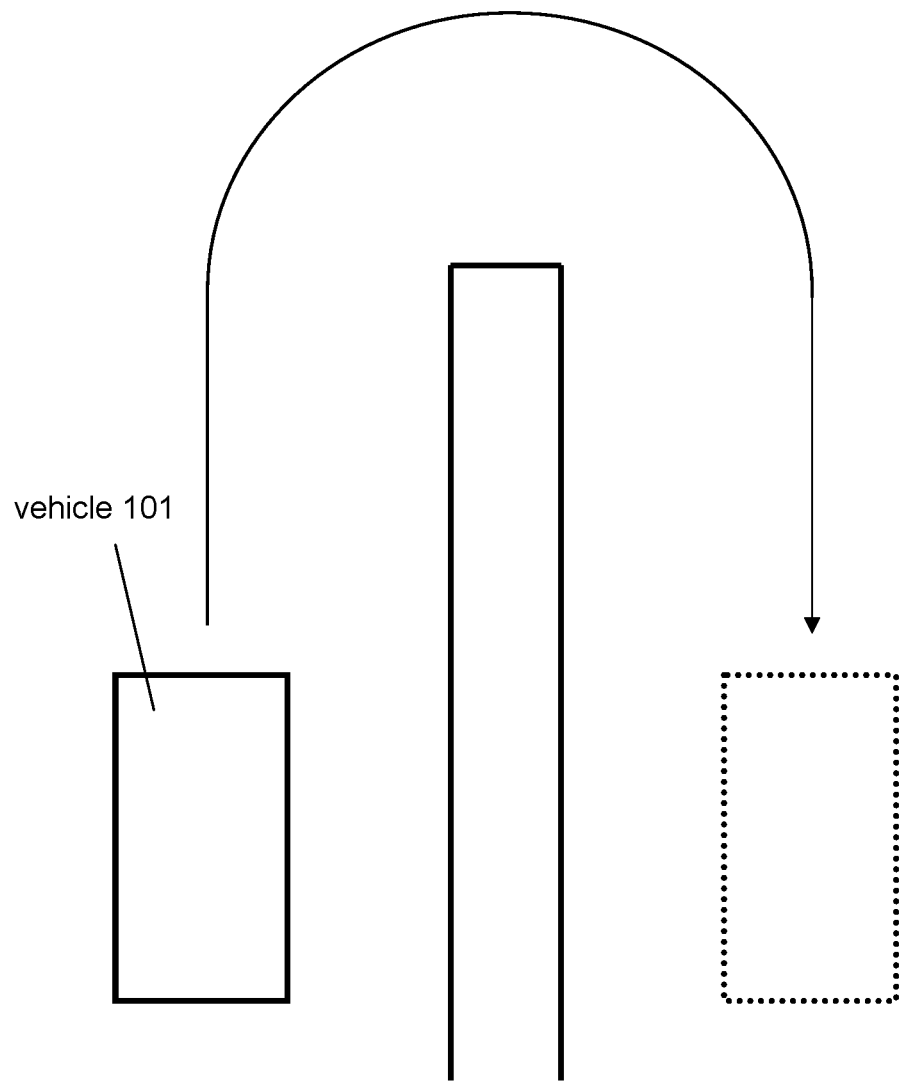
FIG. 10 illustrates a bird's eye view of a vehicle making a U-turn.
Figure 11:
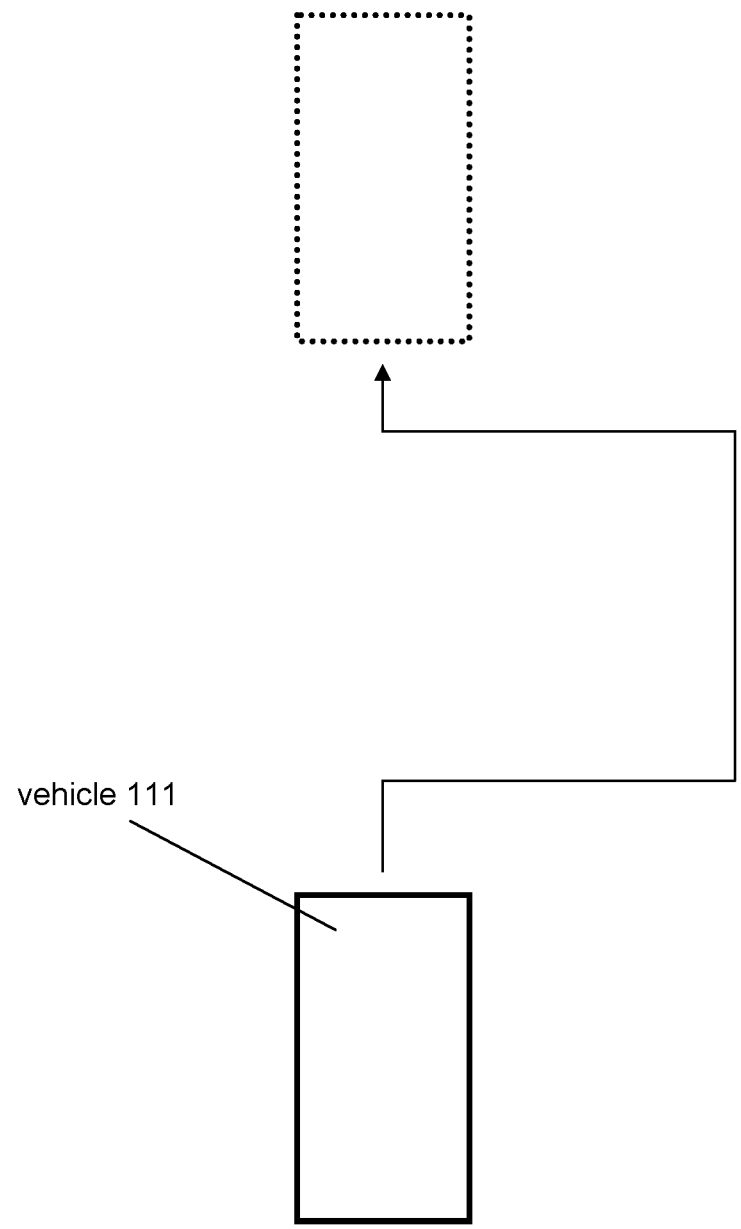
FIG. 11 illustrates a bird's eye view of a vehicle swerving to the right and then swerving back to its original course.

FIGS. 9-11 illustrate a bird's eye view of a vehicle in motion. Simulation stimuli corresponding to a vehicle movement is generated when the vehicle makes a certain movement. In FIG. 9, vehicle 91 makes a lane change to the right while moving forward (simulation event). In response, for example, visual simulation showing the virtual vehicle moving to the right (simulation stimulus) is generated. As another example, provision of the simulation experience may include operating a speaker of simulation device 13 to provide audio simulation relating to a virtual vehicle making a course change (e.g., change in a rocket engine operation, etc.).

In FIG. 10, vehicle 101 makes a U-turn (simulation event). In response, for example, visual simulation showing the virtual vehicle captured and pulled by a tractor beam of a virtual Death Star (simulation stimulus) is generated. As another example, provision of the simulation experience may include operating a speaker of simulation device 13 to provide audio simulation relating to a virtual vehicle being caught in a tractor beam (e.g., groaning sounds coming from metal hull under stress, alarm noises indicating the tractor beam, etc.).

FIG. 11 illustrates a bird's eye view of a vehicle 111 swerving to the right and then swerving back to its original course (simulation event). In response, for example, visual simulation showing the virtual vehicle swerving to avoid a virtual asteroid (simulation event) is generated. As another example, provision of the simulation experience may include operating a speaker of simulation device 13 to provide audio simulation relating to avoiding an object in space (e.g., virtual passengers discussing the asteroid, a computer announcement that the virtual vehicle passed by the virtual asteroid within a certain distance, etc.). Other simulation stimulus and simulation events are contemplated.

In some implementations, simulation provision component 25 may be configured to effectuate provision of a simulated experience by incorporating environment information of a vehicle into the simulation experience. Simulation provision component 25 may obtain environment information of the vehicle from one or more of ride information component 22, output signals generated by sensor 12, and/or another sensors. For example, simulation provision component 25 may obtain information relating to one or more of terrain, nearby objects, nearby buildings, and/or other environment information from an image sensor of sensor 12. As another example, simulation provision component 25 may obtain information relating to one or more of terrain, nearby objects, nearby buildings, and/or other environment information by determining a location of the vehicle from output signals generated by sensor 12 and obtaining environment information at the location from a communication device.

For example, a simulation experience may relate to a virtual vehicle being chased by stormtroopers on virtual speeder bikes and a vehicle may be traveling next to and/or on a mountain. Simulation provision component 25 may incorporate the mountain into the simulation experience by having the virtual speeder bikes traveling over the terrains of the mountain, where the virtual speeder bikes are hovering at a certain distance over the terrains of the mountain. As another example, a vehicle may be traveling in a city and simulation provision component 25 may incorporate buildings and/or objects of the city into the simulation experience by having the virtual speeder bikes weaving between the buildings and/or objects. As another example, simulation provision component 25 may incorporate buildings and/or objects in the city as virtual barriers in the simulation experience so that when a virtual speeder bike hits a building/object, the virtual speeder bike will crash into the building/object.

Although processor 11, sensor 12, simulation device 13, and electronic storage 14 are shown to be connected to a bus 15 in FIG. 1, any communication medium may be used to facilitate interaction between any components of system 10. One or more components of system 10 may communicate with each other through hard-wired communication, wireless communication, or both. For example, processor 11 may wirelessly communicate with sensor 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of simulation experience component 20, simulation information component 21, ride information component 22, simulation event occurrence component 23, simulation stimuli generation component 24, simulation provision component 25, and/or other components by software; hardware; firmware; some combination of software, hardware, and/or firmware; and/or other mechanisms for configuring processing capabilities on processor 11.

It should be appreciated that although simulation experience component 20, simulation information component 21, ride information component 22, simulation event occurrence component 23, simulation stimuli generation component 24, and simulation provision component 25 are illustrated in FIG. 1 as being co-located within a single processing unit, in implementations in which processor 11 comprises multiple processing units, one or more of simulation experience component 20, simulation information component 21, ride information component 22, simulation event occurrence component 23, simulation stimuli generation component 24, and/or simulation provision component 25 may be located remotely from the other computer program components.

The description of the functionality provided by the different computer program components 20, 21, 22, 23, 24, and/or 25 described herein is for illustrative purposes, and is not intended to be limiting, as any of computer program components 20, 21, 22, 23, 24 and/or 25 may provide more or less functionality than is described. For example, one or more of computer program components 20, 21, 22, 23, 24 and/or 25 may be eliminated, and some or all of its functionality may be provided by other computer program components 20, 21, 22, 23, 24 and/or 25. As another example, processor 11 may be configured to execute one or more additional computer program components that may perform some or all of the functionality attributed to one or more of computer program components 20, 21, 22, 23, 24 and/or 25.

Although sensor 12 is depicted in FIG. 1 as a single element, this is not intended to be limiting. Sensor 12 may include one or more of image sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, and/or other sensors in one or more locations.

Although simulation device 13 is depicted in FIG. 1 as a single element, this is not intended to be limiting. Simulation device 13 may include one or more of a display, a speaker, a light source, an air conditioner, a heater, a temperature controller and/or other simulation devices in one or more locations.

The electronic storage media of electronic storage 14 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 10, or electronic storage 14 may be provided integrally with one or more other components of system 10 (e.g., processor 11). Although electronic storage 14 is shown in FIG. 1 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

FIG. 2 illustrates method 200 for using a vehicle as a motion base for a simulated experience. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, simulation information for a simulated experience may be obtained. The simulation information may include simulation stimuli that correspond to simulation events. The stimulation stimuli may include a first simulation stimulus corresponding to a first simulation event. In some implementations, operation 201 may be performed by a processor component the same as or similar to simulation information component 21 (shown in FIG. 1 and described herein).

At operation 202, ride information may be obtained. The ride information may include motion information that characterizes a motion experience by a person in a vehicle. In some implementations, operation 202 may be performed by a processor component the same as or similar to ride information component 22 (shown in FIG. 1 and described herein).

At operation 203, occurrences of the simulation events may be identified based on the ride information. In some implementations, operation 203 may be performed by a processor component the same as or similar to simulation event occurrence component 23 (shown in FIG. 1 and described herein).

At operation 204, the simulation stimuli may be generated. The simulation stimuli may correspond to the simulation events for which occurrences are identified, such that responsive to identification of an occurrence of the first simulation event, the first simulation stimulus may be generated. In some implementations, operation 204 may be performed by a processor component the same as or similar to simulation stimuli generation component 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to use a vehicle as a motion base for a recreation presentation including presentation of simulated content, the presentation of the simulated content being provided by one or more simulation devices in the vehicle, the system comprising:
    one or more processors configured by machine readable instructions to:
        obtain simulated content information, the simulated content information defining the simulated content, wherein the simulated content includes multiple different stories, an individual story being defined by an individual story duration, wherein the individual story duration includes different predefined segments, the different predefined segments including an individual beginning segment, an individual peak segment, and an individual ending segment, wherein the individual peak segment occurs between the individual beginning segment and the individual ending segment, wherein the multiple different stories include a first story and one or more other stories, the first story having a first story duration including a first beginning segment, a first ending segment, and a first peak segment occurring between the first beginning segment and the first ending segment;
        obtain simulation information, the simulation information including simulation stimuli that correspond to simulation events, the simulation stimuli including a visual stimulus, an audio stimulus, a haptic stimulus, or a combination thereof, that changes the simulated content, the simulation stimuli including a first simulation stimulus corresponding to a first simulation event;
        obtain ride information, the ride information including vehicle motion information that characterizes a real-time motion of the vehicle during a trip and user motion information that characterizes a motion of a user in the vehicle during the trip, the real-time motion of the vehicle during the trip being characterized by one or more of the vehicle moving backwards a jostling of the vehicle, the vehicle hitting a speedbump, or the vehicle hitting a pothole, or a combination thereof, the real-time motion of the vehicle being derived from output signals from one or more sensors coupled to the vehicle, the motion of the user being derived from an output signal from a sensor worn by the user;
        select a story from the multiple different stories for presentation during the trip based on a duration of the trip and the simulated content information, wherein the story is selected based on the individual story duration matching the duration of the trip and the individual peak segment of the story being reached when the vehicle is expected to have a given distance or a given duration remaining in the trip, wherein the story that is selected is the first story based on the first story duration matching the duration of the trip and the first peak segment being reached when the vehicle is expected to have the given distance or the given duration remaining in the trip;
        identify occurrences of the simulation events in real-time based on the vehicle motion information characterizing the real-time motion of the vehicle during the trip;
        identify the simulation stimuli for the first story that correspond to the simulation events for which the occurrences are identified, such that responsive to identification of an occurrence of the first simulation event based on the vehicle motion information, the first simulation stimulus is identified, wherein the first simulation stimulus provides one or more of a first visual stimulus, a first audio stimulus, or a first haptic stimulus for the first story; and
        generate the simulation stimuli for which the occurrences are identified to make a change in the first story in accordance with the first simulation stimulus, wherein generating the first simulation stimulus includes automatically controlling the one or more simulation devices to provide the first simulation stimulus.

2. The system of claim 1, wherein the ride information further includes activity information that characterizes an action performed or a sound made by the user in the vehicle.

3. The system of claim 1, wherein the ride information further includes trip progress information that characterizes a location of the vehicle along the trip or a remaining expected duration of the trip.

4. The system of claim 1, wherein the ride information further includes environment information that characterizes an environment around the vehicle.

5. The system of claim 1, wherein the ride information further includes caravanning information that characterizes a relative position of the vehicle to another vehicle.

6. The system of claim 1, wherein the one or more processors are further configured by the machine readable instructions to effectuate provision of the recreation presentation by operating a light source inside the vehicle, a speaker, a display, or a combination thereof.

7. The system of claim 1, wherein the one or more processors are further configured by the machine readable instructions to effectuate provision of the recreation presentation by operating an air conditioner, a heater, a temperature controller of the vehicle, or a combination thereof.

8. The system of claim 1, wherein the given distance includes 30% of a total distance of the trip and the given duration includes 30% of the duration of the trip.

9. A method for using a vehicle as a motion base for a recreation presentation including presentation of simulated content, the presentation of the simulated content being provided by one or more simulation devices in the vehicle, the method comprising:
 obtaining simulated content information, the simulated content information defining the simulated content, wherein the simulated content includes multiple different stories, an individual story being defined by an individual story duration, wherein the individual story duration includes different predefined segments, the different predefined segments including an individual beginning segment, an individual peak segment, and an individual ending segment, wherein the individual peak segment occurs between the individual beginning segment and the individual ending segment, wherein the multiple different stories include a first story and one or more other stories, the first story having a first story duration including a first beginning segment, a first ending segment, and a first peak segment occurring between the first beginning segment and the first ending segment;
 obtaining simulation information, the simulation information including simulation stimuli that correspond to simulation events, the simulation stimuli including a visual stimulus, an audio stimulus, a haptic stimulus, or a combination thereof that changes the simulated content, the simulation stimuli including a first simulation stimulus corresponding to a first simulation event;
 obtaining ride information, the ride information including vehicle motion information that characterizes a real-time motion of the vehicle during a trip and user motion information that characterizes a motion of a user in the vehicle during the trip, the real-time motion of the vehicle during the trip being characterized by one or more of the vehicle moving backwards, a jostling of the vehicle, the vehicle hitting a speedbump, or the vehicle hitting a pothole, the real-time motion of the vehicle being derived from output signals from one or more sensors coupled to the vehicle, the motion of the user being derived from output signals from a sensor worn by the user;
 selecting a story from the multiple different stories for presentation during the trip based on a duration of the trip and the simulated content information, wherein the story is selected based on the individual story duration matching the duration of the trip and the individual peak segment of the story being reached when the vehicle is expected to have a given distance or a given duration remaining in the trip, wherein the story that is selected is the first story based on the first story duration matching the duration of the trip and the first peak segment being reached when the vehicle is expected to have the given distance or the given duration remaining in the trip;
 identifying occurrences of the simulation events in real-time based on the vehicle motion information characterizing the real-time motion of the vehicle during the trip;
 identifying the simulation stimuli for the first story that correspond to the simulation events for which the occurrences are identified, such that responsive to identification of an occurrence of the first simulation event based on the vehicle motion information characterizing the real-time motion of the vehicle during the trip, the first simulation stimulus is identified, wherein the first simulation stimulus provides one or more of a first visual stimulus, a first audio stimulus, or a first haptic stimulus for the first story; and
 generating the simulation stimuli for which the occurrences are identified to make a change in the first story in accordance with the first simulation stimulus, wherein generating the first simulation stimulus includes automatically controlling the one or more simulation devices to provide the first simulation stimulus.

10. The method of claim 9, wherein the ride information further includes activity information that characterizes an action performed or a sound made by the user in the vehicle.

11. The method of claim 9, wherein the ride information further includes trip progress information that characterizes a location of the vehicle along the trip or a remaining expected duration of the trip.

12. The method of claim 9, wherein the ride information further includes environment information that characterizes an environment around the vehicle.

13. The method of claim 9, wherein the ride information further includes caravanning information that characterizes a relative position of the vehicle to another vehicle.

14. The method of claim 9, wherein further comprising effectuating provision of the recreation presentation by operating a light source inside the vehicle, a speaker, a display, or a combination thereof.

15. The method of claim 9, wherein further comprising effectuating provision of the recreation presentation by operating an air conditioner, a heater, a temperature controller of the vehicle, or a combination thereof.

16. The method of claim 9, wherein the given distance includes 30% of a total distance of the trip and the given duration includes 30% of the duration of the trip.

* * * * *